United States Patent
Moruzzi (10) Patent No.: US 11,650,118 B2
(45) Date of Patent: May 16, 2023

(54) DIFFERENTIAL PRESSURE SENSOR WITH MAGNETIC DIAL

(71) Applicant: Watts Industries Italia S.R.L., Trento (IT)

(72) Inventor: Paolo Moruzzi, Villa Lagarina (IT)

(73) Assignee: Watts Industries Italia S.R.L., Fraz Gardolo (IT)

(*) Notice: Subject to any disclaimer, the term of this patent is extended or adjusted under 35 U.S.C. 154(b) by 399 days.

(21) Appl. No.: 16/811,803

(22) Filed: Mar. 6, 2020

(65) Prior Publication Data
US 2020/0284674 A1 Sep. 10, 2020

Related U.S. Application Data

(60) Provisional application No. 62/815,812, filed on Mar. 8, 2019.

(51) Int. Cl.
*G01F 5/00* (2006.01)
*G01L 7/18* (2006.01)

(52) U.S. Cl.
CPC ............ *G01L 7/18* (2013.01); *G01F 5/005* (2013.01)

(58) Field of Classification Search
CPC ... G01L 7/18; G01L 7/185; G01L 9/00; G01L 11/004; G01L 19/16; G01L 19/08; G01F 5/005; G01F 5/00
See application file for complete search history.

(56) References Cited

U.S. PATENT DOCUMENTS

| 213,394 A | 3/1879 | Cornwal |
| 2,310,586 A | 2/1943 | Lohman |
| 2,827,921 A | 3/1958 | Sherman et al. |
| 3,173,439 A | 3/1965 | Griswold et al. |
| 3,189,037 A | 6/1965 | Modesto |
| 3,429,291 A | 2/1969 | Hoffman |
| 3,837,357 A | 9/1974 | Slaughter |

(Continued)

FOREIGN PATENT DOCUMENTS

| CN | 110081212 A | 8/2019 |
| DE | 1925477 U | 12/1970 |

(Continued)

OTHER PUBLICATIONS

Orange Research Inc., Differential Pressure Sensor, retrieved online, www.orangeresearch.com/pistonVsDiaphragm.php, 2 pgs.

(Continued)

*Primary Examiner* — Tarun Sinha
*Assistant Examiner* — James I Burris
(74) *Attorney, Agent, or Firm* — Day Pitney LLP; George N. Chaclas (57) ABSTRACT

A differential pressure sensor is provided with an indicator assembly to represent the measured differential pressure. The sensor includes a cylindrical tube with a magnetic piston slidably disposed within. The indicator assembly is positioned adjacent to the tube and includes a first magnet having a first polarity direction and a second magnet having a second polarity direction. The magnets are provided in the indicator assembly such that the first and second polarity directions are parallel to one another. The first and second magnets are symmetrically disposed and offset from one another about a center of rotation of the indicator assembly.

18 Claims, 7 Drawing Sheets

(56) References Cited

U.S. PATENT DOCUMENTS

| | | |
|---|---|---|
| 3,837,358 A | 9/1974 | Zieg et al. |
| 3,859,619 A | 1/1975 | Ishihara et al. |
| 3,896,850 A | 7/1975 | Waltrip |
| 3,996,962 A | 12/1976 | Sutherland |
| 4,014,284 A | 3/1977 | Read |
| 4,244,392 A | 1/1981 | Griswold |
| 4,416,211 A | 11/1983 | Hoffman |
| 4,489,746 A | 12/1984 | Daghe et al. |
| 4,523,476 A | 6/1985 | Larner |
| 4,618,824 A | 10/1986 | Magee et al. |
| 4,667,697 A | 5/1987 | Crawford |
| 4,777,979 A | 10/1988 | Twerdochlib |
| 4,920,802 A | 5/1990 | McMullin et al. |
| 4,945,940 A | 8/1990 | Stevens |
| 5,008,841 A | 4/1991 | McElroy |
| 5,024,469 A | 6/1991 | Aitken et al. |
| 5,125,429 A | 6/1992 | Ackroyd et al. |
| 5,236,009 A | 8/1993 | Ackroyd |
| 5,404,905 A | 4/1995 | Lauria |
| 5,425,393 A | 6/1995 | Everett |
| 5,520,367 A | 5/1996 | Stowers |
| 5,551,473 A | 9/1996 | Lin et al. |
| 5,566,704 A | 10/1996 | Ackroyd et al. |
| 5,669,405 A | 9/1997 | Engelmann |
| 5,713,240 A | 2/1998 | Engelmann |
| 5,901,735 A | 5/1999 | Breda |
| 6,123,095 A | 9/2000 | Kersten et al. |
| 6,170,510 B1 | 1/2001 | King et al. |
| 6,343,618 B1 | 2/2002 | Britt et al. |
| 6,349,736 B1 | 2/2002 | Dunmire |
| 6,374,849 B1 | 4/2002 | Howell |
| 6,471,249 B1 | 10/2002 | Lewis |
| 6,513,543 B1 | 2/2003 | Noll et al. |
| 6,581,626 B2 | 6/2003 | Noll et al. |
| 6,659,126 B2 | 12/2003 | Dunmire et al. |
| 6,675,110 B2 | 1/2004 | Engelmann |
| 7,506,395 B2 | 3/2009 | Eldridge |
| 7,934,515 B1 | 5/2011 | Towsley et al. |
| 8,220,839 B2 | 7/2012 | Hall |
| 8,997,772 B2 | 4/2015 | Noll et al. |
| 9,091,360 B2 | 7/2015 | Frahm |
| 9,546,475 B2 | 1/2017 | Lu |
| 9,995,605 B2 | 6/2018 | Konno et al. |
| 10,132,425 B2 | 11/2018 | Di Monte |
| 10,561,874 B2 | 2/2020 | Williams et al. |
| 10,719,904 B2 | 7/2020 | Yasumuro et al. |
| 10,883,893 B2 | 1/2021 | Shaw et al. |
| 10,914,412 B2 | 2/2021 | Doughty et al. |
| 10,962,143 B2 | 3/2021 | Cis et al. |
| 2003/0000577 A1 | 1/2003 | Noll et al. |
| 2004/0045604 A1 | 3/2004 | Dunmire et al. |
| 2004/0107993 A1 | 6/2004 | Stephens |
| 2005/0092364 A1 | 5/2005 | Furuya et al. |
| 2005/0199291 A1 | 9/2005 | Price et al. |
| 2006/0021443 A1 | 2/2006 | Buchanan |
| 2006/0196542 A1 | 9/2006 | Yen |
| 2007/0181191 A1 | 8/2007 | Wittig et al. |
| 2007/0193633 A1 | 8/2007 | Howell et al. |
| 2007/0240765 A1 | 10/2007 | Katzman et al. |
| 2008/0289567 A1 | 11/2008 | Gordon |
| 2009/0194719 A1 | 8/2009 | Mulligan |
| 2017/0023141 A1 | 1/2017 | Andersson |
| 2019/0043157 A1 | 2/2019 | Yasumuro et al. |
| 2019/0162341 A1 | 5/2019 | Chiproot |
| 2019/0323618 A1 | 10/2019 | Fletcher et al. |
| 2020/0141612 A1 | 5/2020 | Thibodeaux |
| 2020/0284674 A1 * | 9/2020 | Moruzzi ............... G01L 7/18 |
| 2021/0172157 A1 | 6/2021 | Burke et al. |
| 2021/0230850 A1 | 7/2021 | Bouchard et al. |

FOREIGN PATENT DOCUMENTS

| | | | |
|---|---|---|---|
| DE | 8525261 U1 | 11/1985 | |
| DE | 202014102568 U1 | 9/2015 | |
| EP | 0000818 A1 | 2/1979 | |
| EP | 1214915 A1 * | 6/2002 | ............... A61C 1/06 |
| JP | 2002213629 A | 7/2002 | |
| WO | 2003060459 A1 | 7/2003 | |
| WO | 2020023584 A1 | 1/2020 | |

OTHER PUBLICATIONS

Lead Free Master Series LF870V product specifications pages, ES-F-LF-870V 1826, 2018, 4 pages.

Watt TK-99E Backflow Preventer Test Kit Product Specifications and Test Information, IS-TK99E 0829, 2009, 4 pages.

Zurn Wilkins 300AR Series, Backflow Preventer Order Form No. 480-060, 4117, 2 pages.

Watts Water Technologies Company, Installation, Maintenance & Repair Series 909, LF909, 909RPDA, LF909RPDA, 2016, 8 pages.

Watts Water Company, Series 909RPDA for Health Hazard Applications, 2016, 4 pages.

Watts Regulator Co., WATTS ACV 113-6RFP Flood Protection Shutdown Valve for Health Hazard Applications, 2020, 4 pages.

European Search Report for European Patent Application No. 20192133.5 dated Feb. 1, 2021, 9 pages.

Ames Fire & Waterworks, division of Watts Industries, F-A-Spools/Flanges, 2001, 4 pages.

Watts, S-RetroFit-Simple, 2017, 2 pages.

Apollo Valves, Apollo backflow preventer in-line "R" retrofit series, 2 pages.

*Zurn Industries, LLC* vs. *Conbraco Industries, Inc.*, Complaint for patent infringement, United States District Court for the Center District of California Western Division, Case No. 2.16-CV-5656, Jul. 29, 2016; 5 pages.

Wilkins Company, Model 375/475MS Series, Installation, Maintenance and Instruction Sheet, 2006, 1 page.

Wilkins Model 420 XL Lead-Free pressure Vacuum Breakers 1/2", 3/4", and 1", pp. 60-70.

Apollo Valves PVB4A Series Installation, Operation and Maintenance Manual for Model PVB4A 1/2"-2" Pressure Vacuum Breaker Backflow Preventer, dated Jan. 11, 2012, 12 pages.

Apollo Valves PVB4A Series Installation, Operation, and Maintenance Manual, copyright May 2009, 9 pages.

Watts Water Technologies Company Brochure ES LF800M4QT for Health Hazard Applications Lead Free Series LF8 M4QT Anti-Siphon Vacuum Breakers Sizes 1/2"-2", copyright 2013,4 pages.

Conbraco BFMMPVB Maintenance Manual for Series 4V-500 1/2"-2" Pressure Type Vacuum Breaker, 04/02, Conbraco Industries, Inc., Matthews, North Carolina 28106, 6 pages.

Watts, "Double Check Valve Assembly Backflow Preventers, Bronze," Article 1, 2021, 6 pages.

Watts, "Reduced Pressure Zone Assembly Backflow Preventers, Bronze Body, Sizes 1/4-2 IN," Article 1, 2021, 16 pages.

Miscellaneous Communication issued in European patent application No. 20211811.3, dated May 4, 2021, 8 pages.

Office Action issued in corresponding Chinese patent application No. 20201920527.3, dated Mar. 20, 2021, 1 page (translation unavailable).

International Search Report and Written Opinion issued in corresponding international patent application No. PCT/US2021/046208, dated Dec. 1, 2021, 8 pages.

* cited by examiner

FIG. 1
PRIOR ART

PRIOR ART

FIG. 2A

PRIOR ART

DIFFERENTIAL PRESSURE SENSOR WITH MAGNETIC DIAL

CROSS-REFERENCE TO RELATED APPLICATIONS

This application claims priority to U.S. Provisional Application No. 62/815,812, entitled "Differential Pressure Sensor With Magnetic Dial," filed on Mar. 8, 2019 which is hereby incorporated by reference in its entirety for all purposes.

FIELD OF THE DISCLOSURE

The disclosure relates, generally, to a gauge or dial of a differential pressure sensor.

BACKGROUND

Differential pressure sensors are known and used to determine that the flow rate, e.g., of water, in a heating system is properly balanced. Heating systems operate more efficiently when properly balanced.

Figure 1:
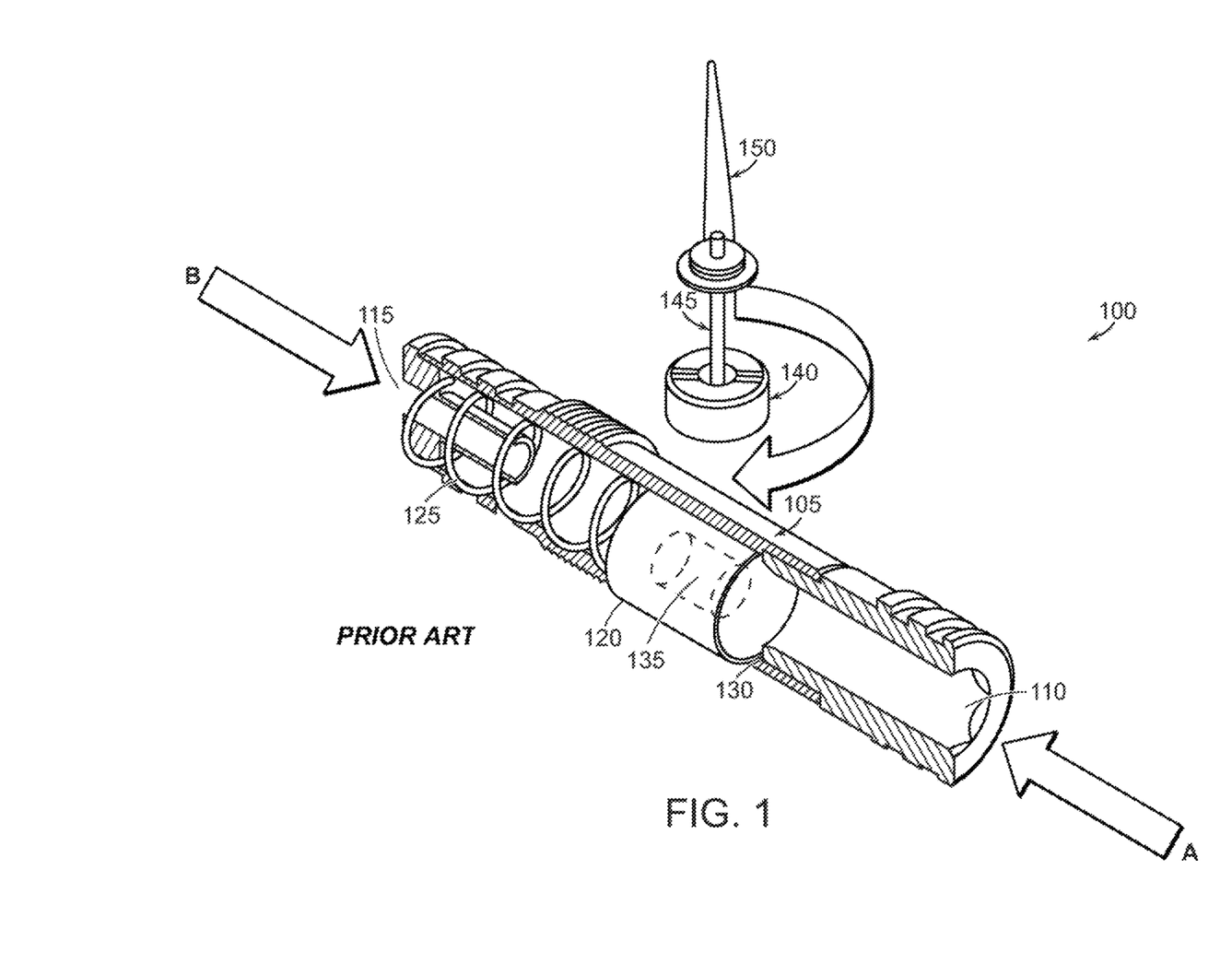
FIG. 1 is a known piston-type differential pressure sensor.

A known piston-type differential pressure sensor 100, as shown in FIG. 1, includes a cylindrical tube 105 having a first inlet 110 and a second inlet 115. A magnetic piston 120 is slidably disposed to move inside the tube 105 along a longitudinal axis of the tube 105 and, in a rest state, is urged by a spring 125 away from the second inlet 115 and up against an internal stop 130. The magnetic piston 120 can include a magnetic portion 135 with its polarity axially oriented along, or parallel to, the longitudinal axis of the tube 105.

A first fluid pressure or flow A is provided at the first inlet 110 and a second fluid pressure or flow B is provided at the second inlet 115. The fluid may be a liquid or gas, such as water or air. When the pressure A is greater than the pressure B and the force of the spring 125, the piston will move toward the inlet 115.

Figure 2A:
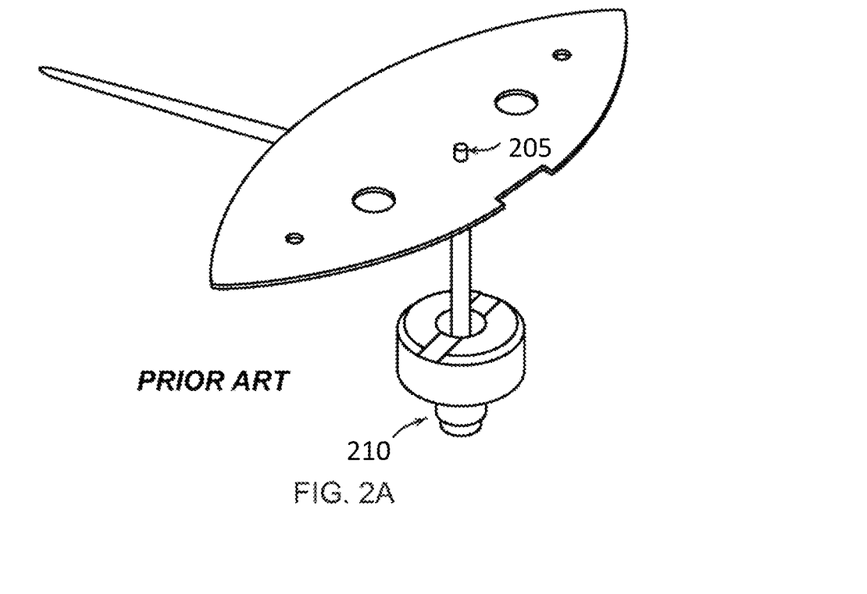
FIG. 2A is a perspective view of a portion of the sensor of FIG. 1.
Figure 2B:
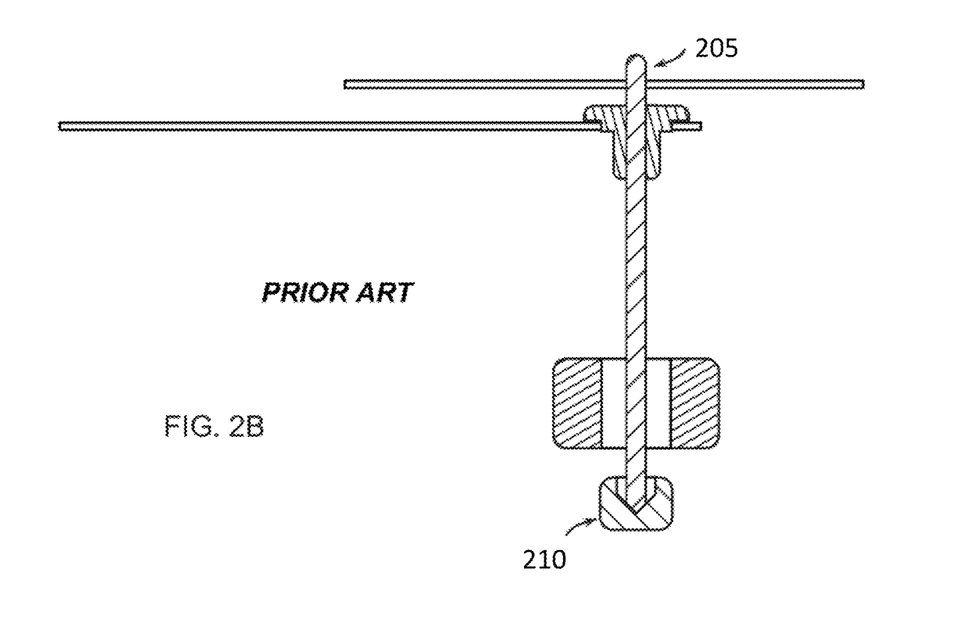
FIG. 2B is a side view of a portion of the sensor of FIG. 1.

A rotatable magnet 140 is provided on a rotatable shaft 145 and the magnet 140 is positioned adjacent the piston 120 such that they are magnetically coupled to one another. The rotating magnet 140 is diametrically polarized. A pointer 150 is coupled to the shaft 145 and extends perpendicularly therefrom. The shaft 145 can rotate about its own axis by operation of a hinge 205 and/or a rotation contact point 210, as shown in FIGS. 2A and 2B.

A differential pressure is generated when pressure A is greater than pressure B and the force of the spring 125. The displacement of the piston 120 is inversely proportional to the rigidity of the spring 125. The magnetic coupling between the magnetic piston 120 and the magnet 140 causes the shaft 145 to spin about its axis when the piston 120 is displaced and, consequently, the pointer 150 rotates.

If the coupling forces are of the same order of magnitude as the friction of the hinges 205 and the friction of the contact points 210, the pointer 150 and, therefore, the sensor 100, will underperform. The magnetic coupling can be improved by increasing the force or cutting the distance between the piston 120 and the magnet 140, however, the friction between the Shaft 145 and the hinges 20 increases causing inaccurate indication of the measured quantity. For this reason, and others, the known sensor 100 suffers from severe measurement uncertainty.

Accordingly, a better differential pressure sensor is needed.

SUMMARY OF THE INVENTION

In one aspect of the present disclosure there is a differential pressure sensor, comprising: a tube; a magnetic piston slidably disposed in the tube; a rotatable base, having a respective center of rotation; a first magnet disposed in the base; and a second magnet disposed in the base, wherein the first and second magnets are symmetrically oriented, and offset from one another, about the center of rotation of the base, and wherein the rotatable base is positioned adjacent to the tube such that each of the first and second magnets magnetically couples to the magnetic piston.

In some embodiments of the differential pressure sensor, the piston moves along a linear portion of the tube between predetermined first and second positions, and the first and second magnets are magnetically coupled to the piston as the piston moves between the first and second positions.

In some embodiments of the differential pressure sensor, the first magnet is disposed in a first quadrant of the base; and the second magnet is disposed in a second quadrant of the base, wherein the first and second quadrants are diagonally arranged with respect to one another about the center of rotation of the rotatable base.

In some embodiments of the differential pressure sensor, the first magnet has a first polarity direction; and the second magnet has a second polarity direction, wherein the first and second polarity directions are arranged such that the first and second polarity directions are parallel to one another.

In some embodiments of the differential pressure sensor, the first and second magnets are of same magnetic strength.

In another aspect of the present disclosure there is a differential pressure sensor, comprising: a cylindrical tube; a magnetic piston slidably disposed in the cylindrical tube; and a rotatable indicator assembly, positioned adjacent to the cylindrical tube. The assembly comprises: a first magnet having a first polarity direction; and a second magnet having a second polarity direction, wherein the first and second magnets are symmetrically disposed, and offset from one another, about a center of rotation of the indicator assembly such that the first and second polarity directions are parallel to one another, and wherein the indicator assembly is positioned adjacent to the cylindrical tube such that the first and second magnets are magnetically coupled to the magnetic piston.

In some embodiments of the differential pressure sensor, the first magnet is disposed in a first quadrant of the indicator assembly; and the second magnet is disposed in a second quadrant of the indicator assembly, wherein the first and second quadrants are diagonally arranged with respect to one another.

In some embodiments of the differential pressure sensor, the first and second magnets are of a same magnetic strength.

In some embodiments of the differential pressure sensor, the indicator assembly is positioned adjacent to the tube such that the indicator assembly rotates in response to movement of the magnetic piston.

In some embodiments of the differential pressure sensor, the indicator assembly further comprises: a linear shaft disposed in line with the center of rotation of the indicator assembly.

In some embodiments of the differential pressure sensor, the indicator assembly further comprises: a pointer coupled to the linear shaft.

In another aspect of the present disclosure there is an apparatus for indicating movement of a magnetic component, comprising: a base; a first magnet, having a first polarity direction, positioned in the base; and a second magnet, having a second polarity direction, positioned in the base, wherein the first and second magnets are positioned in the base such that the first and second polarity directions are parallel to one another, and wherein the first and second magnets are symmetrically disposed, and offset, from one another about a center of rotation of the base.

In some embodiments of the apparatus for indicating movement, the first magnet is disposed in a first quadrant of the base; and the second magnet is disposed in a second quadrant of the base, wherein the first and second quadrants are diagonally arranged with respect to one another.

In some embodiments of the apparatus for indicating movement, the first and second magnets are of a same magnetic strength.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

This application claims priority to U.S. Provisional Application No. 62/815,812, entitled "Differential Pressure Sensor With Magnetic Dial," filed on Mar. 8, 2019 which is hereby incorporated by reference in its entirety for all purposes.

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components or steps set forth in the following description or illustrated in the drawings as it is capable of implementations or of being practiced or carried out in various ways. Also, it is to be understood that the phraseology and terminology employed herein are for description only and should not be regarded as limiting.

Certain features are, for clarity, described in the context of separate implementations, and may also be provided in combination in a single implementation. Conversely, various features, that are, for brevity, described in the context of a single implementation, may also be provided separately or in any suitable sub-combination.

Advantageously, aspects of the present disclosure overcome the deficiencies, due to friction, of the known differential sensor by reducing or overcoming friction between a shaft and its contact points. As will be discussed below in more detail, a magnetic coupling moment is increased by increasing a force arm of a rotating magnetic portion of the device. Two offset magnets, each axially polarized, are positioned offset from one another and respond to movement of a magnetic piston in the sensor. In this way, friction is reduced and spinning torque is increased to improve performance in terms of pointer position accuracy and sensitivity.

Figure 3:
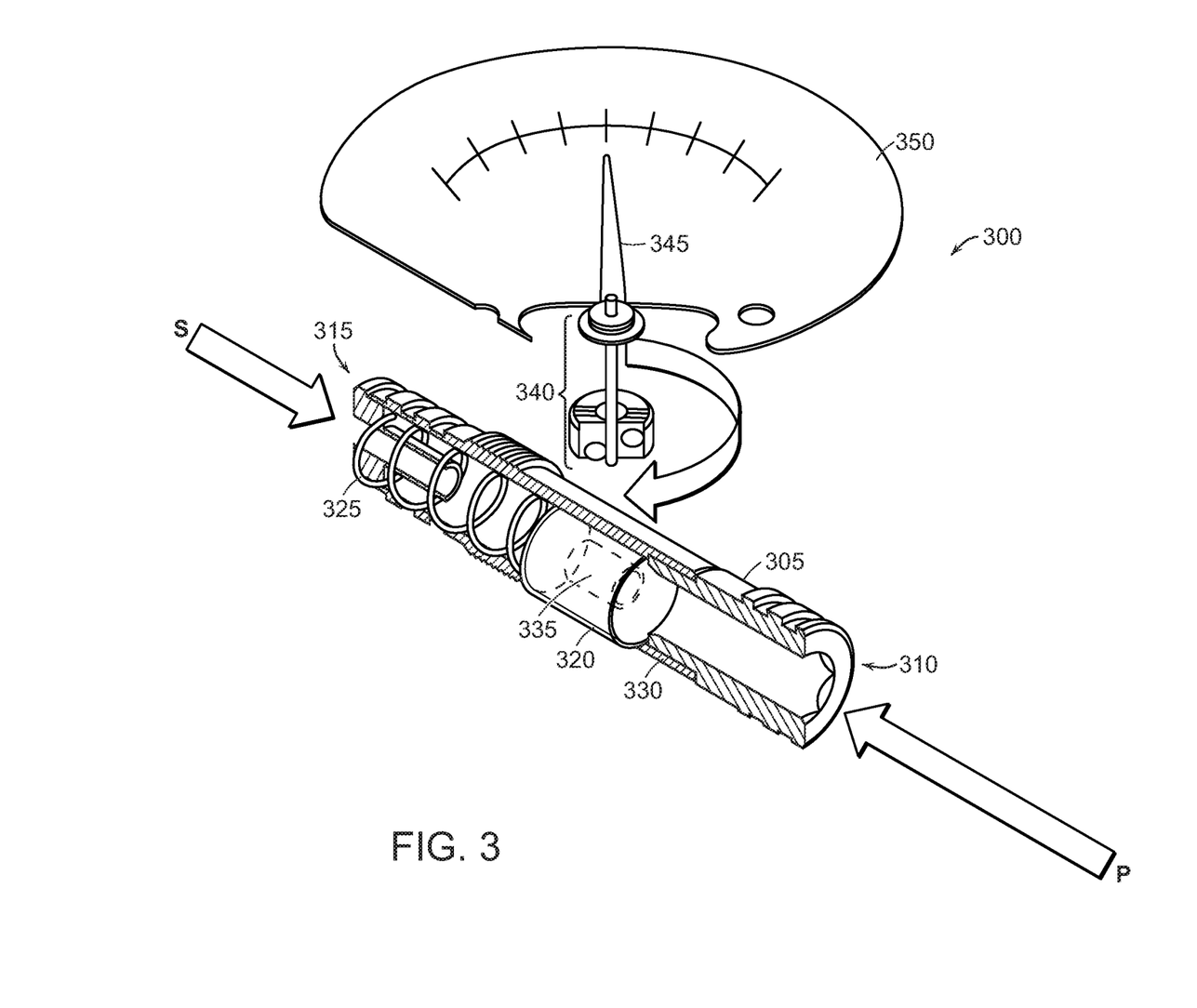
FIG. 3 is a differential pressure sensor in accordance with an aspect of the present disclosure.

Referring now to FIG. 3, a differential pressure sensor 300, in accordance with an aspect of the present disclosure, includes a cylindrical tube 305 having a first inlet 310 and a second inlet 315. A magnetic piston 320 is slidably disposed to move inside the tube 305 along a longitudinal axis of the tube 305 and, in a rest state, is urged by a spring 325 away from the second inlet 315 and up against an internal stop 330. The magnetic piston 320 can include a magnetic portion 335 with its polarity axially oriented along, or parallel to, the longitudinal axis of the tube 305.

A first fluid pressure or flow P is provided at the first inlet 310 and a second fluid pressure or flow S is provided at the second inlet 315. The fluid may be a liquid or gas, such as water or air. When the pressure P is greater than the pressure S and the force of the spring 325, the piston will move toward the second inlet 315.

An indicator assembly 340 is magnetically coupled to the magnetic portion 335 of the piston 320 and includes a pointer 345. As the piston 320 moves, the indicator assembly 340 rotates and moves the pointer 345 across a scale 350 to indicate a relative difference between the pressure P and the pressure S.

Figure 4:
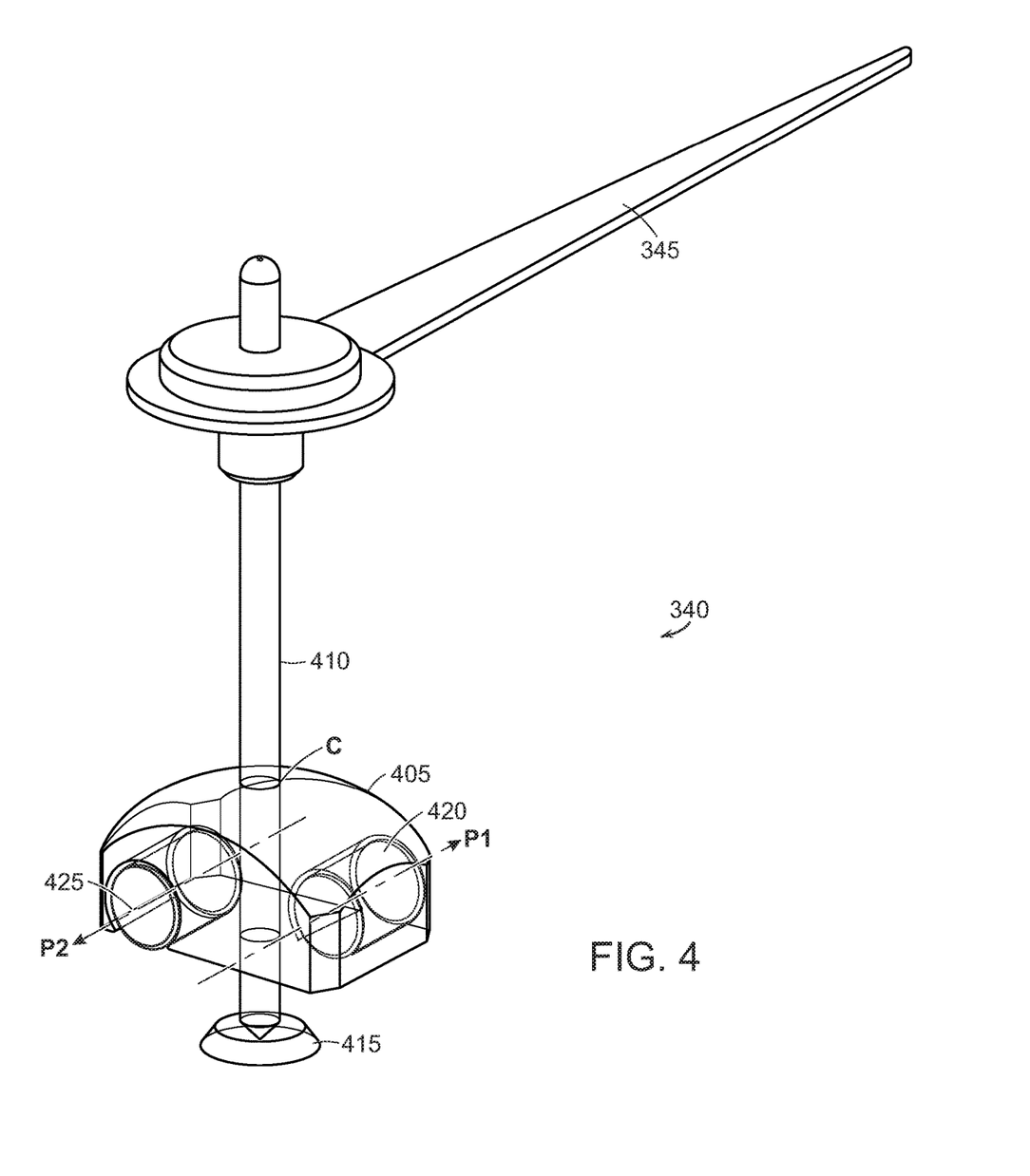
FIG. 4 is a perspective view of an indicator assembly in accordance with an aspect of the present disclosure.

Referring now to FIG. 4, the indicator assembly 340 includes a base portion 405 with a shaft 410 that allows the assembly 340 to rotate. As would be understood by one of ordinary skill in the art, the base portion 405 replaces the magnet 140 of the known system. The pointer 345 extends perpendicularly from the shaft 410. The shaft 410 may extend through the base portion 405 or may be in two parts with a top portion and a bottom portion. The bottom portion of the shaft 410 can be provided in a rotation contact point 415 to facilitate rotation.

Figure 5:
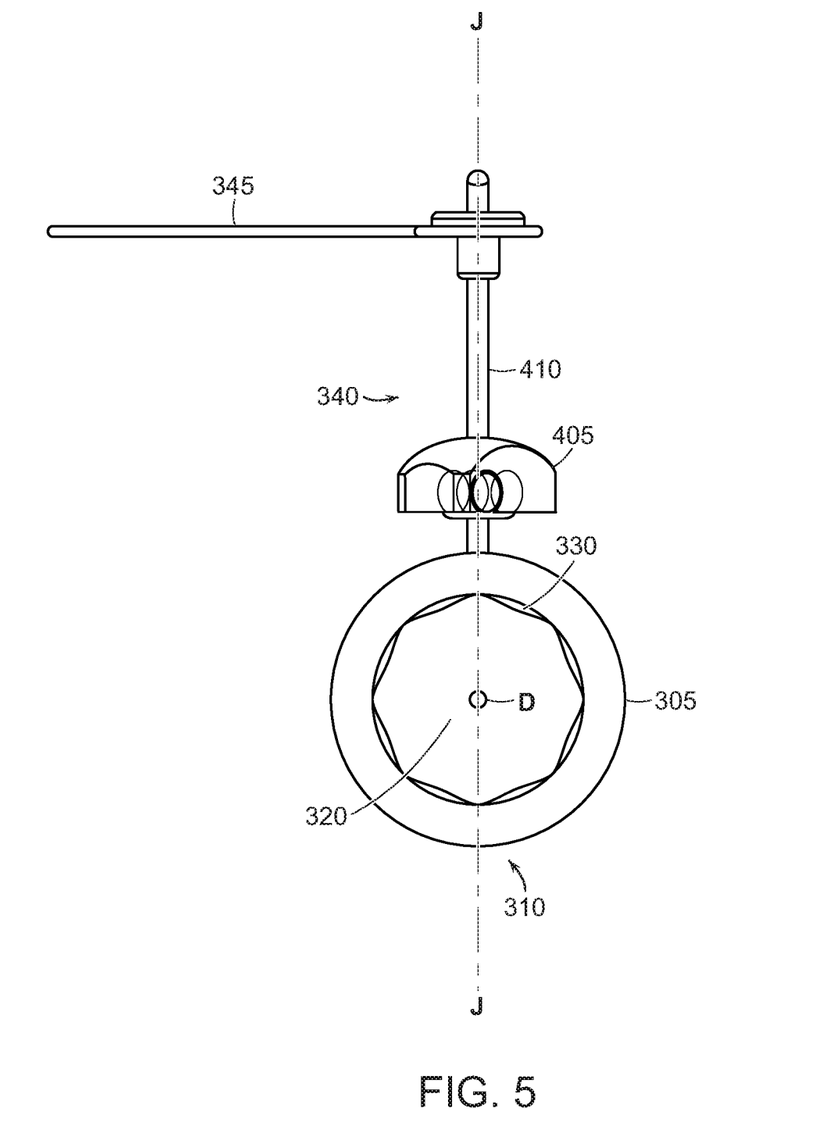
FIG. 5 is a view from an end of the differential pressure sensor of FIG. 3.

The indicator assembly 340 rotates around a line J-J as shown in FIG. 5. As viewed from the first end 310 of the sensor 300, the line J-J passes through the shaft 410 and a center D of the tube 305, i.e., the longitudinal axis of the tube 305.

Figure 6:
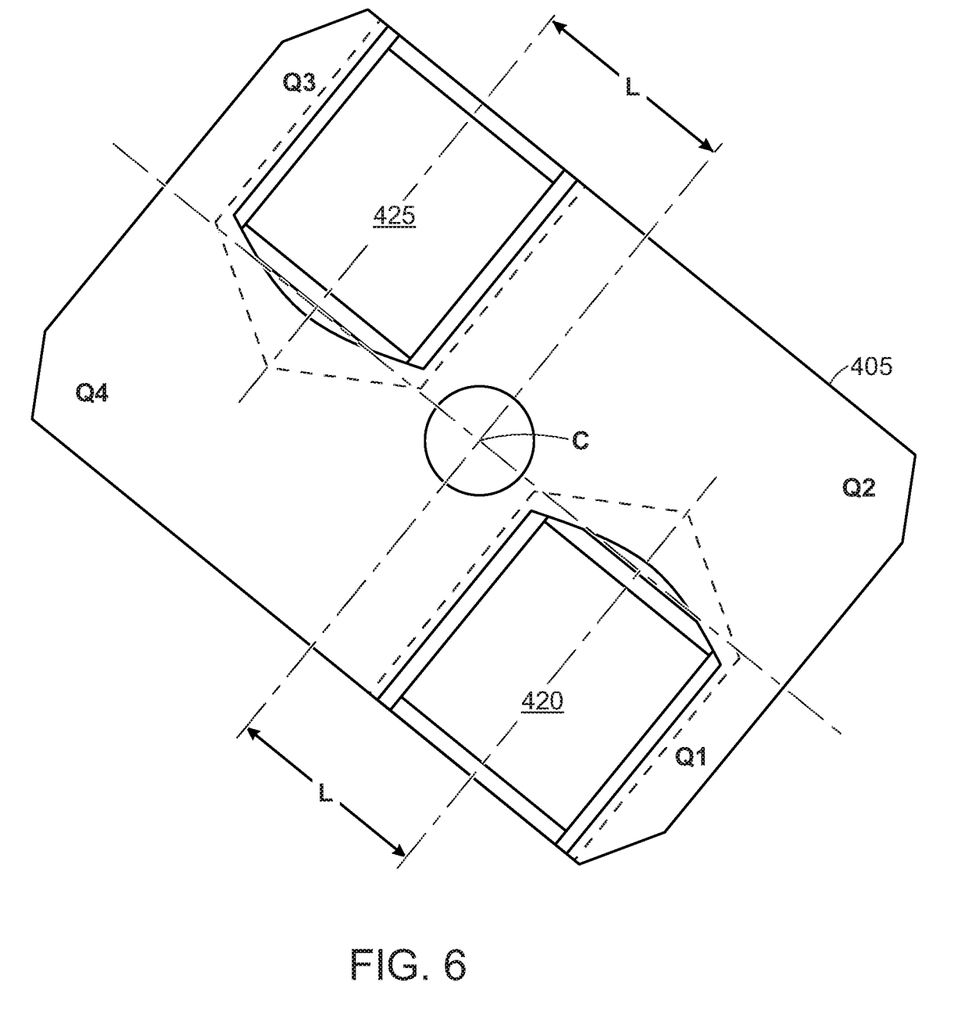
FIG. 6 is a bottom view of the indicator assembly of FIG. 4.

First and second axially polarized magnets 420, 425 are provided in the base portion 405 with their respective polarities P1, P2 generally parallel to one another. In one aspect of the present disclosure, the first and second magnets 420, 425 are of a same size and strength. The first and second magnets 420, 425 are symmetrically disposed and offset about a center of rotation C defined by the shaft 410. Advantageously, a reduction in the magnetic force is attained by this positioning of the magnets 420, 425 in the base portion 405 and the magnetic coupling moment is increased by increasing a force arm L of the base portion 405, as shown in FIG. 6.

Conceptually, the base portion 405 can be considered to have four quadrants Q1-Q4 arranged about the center of rotation C. In an exemplary aspect of the present disclosure, the first magnet 420 is disposed in quadrant Q1 and the second magnet is disposed in quadrant Q3. Of course, as an alternative, the first magnet 420 can be disposed in quadrant Q2 and the second magnet 425 disposed in quadrant Q4. One of ordinary skill in the art will understand that the specific arrangement is a design choice as long as the offset symmetry described herein is maintained.

Figure 7:
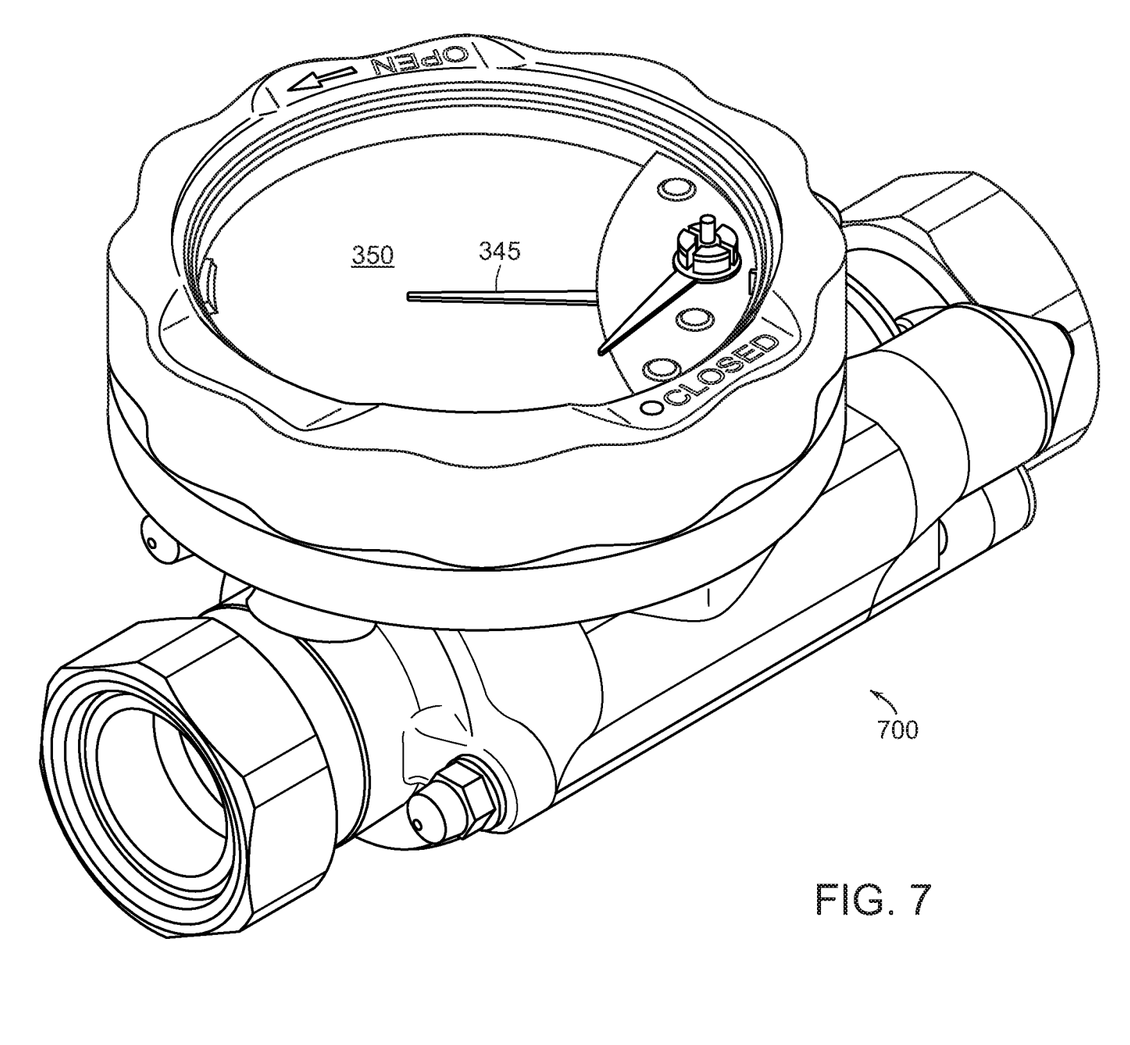
FIG. 7 is a perspective view of a static balancing valve incorporating the differential pressure sensor of the present disclosure.

The differential pressure sensor 300 can be incorporated into a static balancing valve 700 as shown in FIG. 7.

Accordingly, friction is reduced and, at the same time, the spinning torque is increased. This structure provides improved performance in terms of pointer position accuracy and sensitivity.

The foregoing description includes an exemplary implementation of the indicator assembly in a differential pressure sensor. This implementation, however, is not limiting as to the uses of the indicator assembly but merely one example. The indicator assembly can also be provided where it is advantageous to convert the linear motion of a magnet, or an element with a magnet within it, to rotational or radial motion.

It is to be understood that the present disclosure has been described using non-limiting detailed descriptions of aspects thereof that are provided by way of example only and are not intended to limit the scope of the disclosure. Features and/or steps described with respect to one aspect may be used with other aspects and not all aspects of the disclosure have all of the features and/or steps shown in a particular figure or described with respect to one of the aspects. Variations of aspects described will occur to persons of skill in the art.

It should be noted that some of the above described aspects include structure, acts or details of structures and acts that may not be essential to the disclosure and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present disclosure. Therefore, the scope of the disclosure is limited only by the elements and limitations as used in the claims.

Whereas many alterations and modifications of the disclosure will no doubt become apparent to a person of ordinary skill in the art after having read the foregoing description, it is to be understood that the particular aspects shown and described by way of illustration are in no way intended to be considered limiting. Further, the subject matter has been described with reference to particular aspects, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and aspects, the present disclosure is not intended to be limited to the particulars disclosed herein; rather, the present disclosure extends to all functionally equivalent structures, methods and uses, such as are within the scope of the appended claims. Various modifications and changes may be made to the disclosed implementations by persons skilled in the art without departing from the scope of the present disclosure.

What is claimed is:

1. A differential pressure sensor, comprising:
a tube;
a magnetic piston slidably disposed in the tube;
a rotatable base, having a respective center of rotation;
a first magnet disposed in the base; and a second magnet disposed in the base,
wherein the first and second magnets are symmetrically oriented, and offset from one another, about the respective center of rotation of the base,
wherein the rotatable base is positioned adjacent to the tube such that each of the first and second magnets magnetically couples to the magnetic piston, and
wherein: the rotatable base is divided into first, second, third and fourth quadrants by two co-planar perpendicular lines passing through respective center of rotation; the first magnet is disposed in the first quadrant; the second magnet is disposed in the third quadrant; and the first and third quadrants are diagonally arranged with respect to one another about the center of rotation of the rotatable base.

2. The differential pressure sensor of claim 1, wherein the magnetic piston moves along a linear portion of the tube between predetermined first and second positions, and
wherein the first and second magnets are magnetically coupled to the magnetic piston as the magnetic piston moves between the first and second positions.

3. The differential pressure sensor of claim 1, wherein:
the first magnet has a first polarity direction; and
the second magnet has a second polarity direction, wherein the first and second magnets are arranged such that the first and second polarity directions are parallel to one another.

4. The differential pressure sensor of claim 3, wherein the first and second magnets are of a same magnetic strength.

5. The differential pressure sensor of claim 1, further comprising:
a linear shaft disposed in line with the center of rotation of the rotatable base.

6. The differential pressure sensor of claim 5, wherein:
the rotatable base is positioned adjacent to the tube such that the linear shaft is perpendicular to a direction of travel of the magnetic piston.

7. The differential pressure sensor of claim 5, further comprising a pointer coupled to the linear shaft.

8. A differential pressure sensor, comprising:
a cylindrical tube;
a magnetic piston slidably disposed in the cylindrical tube; and
a rotatable indicator assembly, positioned adjacent to the cylindrical tube, comprising:
a first magnet having a first polarity direction; and
a second magnet having a second polarity direction, wherein the first and second magnets are symmetrically disposed, and offset from one another, about a center of rotation of the rotatable indicator assembly such that the first and second polarity directions are parallel to one another, and
wherein the rotatable indicator assembly is positioned adjacent to the cylindrical tube such that the first and second magnets are magnetically coupled to the magnetic piston.

9. The differential pressure sensor of claim 8, wherein the magnetic piston moves along a linear portion of the cylindrical tube between predetermined first and second positions, and
wherein the first and second magnets are magnetically coupled to the magnetic piston as the magnetic piston moves between the first and second positions.

10. The differential pressure sensor of claim 8, wherein:
the first magnet is disposed in a first quadrant of the indicator assembly; and
the second magnet is disposed in a second quadrant of the indicator assembly,
wherein the first and second quadrants are diagonally arranged with respect to one another.

11. The differential pressure sensor of claim 8, wherein the first and second magnets are of a same magnetic strength.

12. The differential pressure sensor of claim 8, wherein the rotatable indicator assembly further comprises:
a linear shaft disposed in line with the center of rotation of the rotatable indicator assembly.

13. The differential pressure sensor of claim 12, wherein the indicator assembly further comprises:
a pointer coupled to the linear shaft.

14. An apparatus for indicating movement of a magnetic component, comprising:
a base;
a first magnet, having a first polarity direction, positioned in the base; and
a second magnet, having a second polarity direction, positioned in the base,
wherein the first and second magnets are positioned in the base such that the first and second polarity directions are parallel to one another, and
wherein the first and second magnet are symmetrically disposed, and offset, from one another about a center of rotation of the base.

15. The apparatus of claim 14, wherein the magnetic component moves along a linear path between predetermined first and second positions, and
wherein the base is positioned such that the first and second magnets are magnetically coupled to the magnetic component as the magnetic component moves between the first and second positions.

16. The apparatus of claim 14, wherein:
the first magnet is disposed in a first quadrant of the base; and
the second magnet is disposed in a second quadrant of the base, wherein the first and second quadrants are diagonally arranged with respect to one another.

17. The apparatus of claim 14, wherein the first and second magnets are of a same magnetic strength.

18. The differential pressure sensor of claim 1, wherein the first and second magnet are each offset a length off force arm from a same one of the two co-planar perpendicular lines.

* * * * *